United States Patent
Elangovan et al.

(10) Patent No.: US 9,666,871 B2
(45) Date of Patent: May 30, 2017

(54) SULFUR TOLERANT ANODE FOR SOLID OXIDE FUEL CELL

(75) Inventors: Singaravelu Elangovan, South Jordan, UT (US); Joseph J. Hartvigsen, Kaysville, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 2244 days.

(21) Appl. No.: 12/240,725

(22) Filed: Sep. 29, 2008

(65) Prior Publication Data

US 2010/0279194 A1 Nov. 4, 2010

Related U.S. Application Data

(60) Provisional application No. 60/975,761, filed on Sep. 27, 2007.

(51) Int. Cl.
| | |
|---|---|
| *H01M 4/86* | (2006.01) |
| *H01M 4/90* | (2006.01) |
| *H01M 8/2425* | (2016.01) |
| *H01M 8/124* | (2016.01) |

(52) U.S. Cl.
CPC ....... *H01M 4/8621* (2013.01); *H01M 4/8642* (2013.01); *H01M 4/8652* (2013.01); *H01M 4/9058* (2013.01); *H01M 4/9066* (2013.01); *H01M 8/2425* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 5,993,986 A | 11/1999 | Wallin et al. | |
| 6,099,985 A * | 8/2000 | Elangovan et al. | 429/535 |
| 6,287,716 B1 * | 9/2001 | Hashimoto et al. | 429/482 |
| 2004/0214070 A1 | 10/2004 | Simner et al. | |
| 2007/0141445 A1 | 6/2007 | Hertz et al. | |

OTHER PUBLICATIONS

Kim et al ("Cu—Ni Cermet Anodes for Direct Oxidation of Methane in Solid-Oxide Fuel Cells", Journal of The Electrochemical Society, 149, A247-A250, 2002).*

(Continued)

*Primary Examiner* — Ula C Ruddock
*Assistant Examiner* — Tony Chuo
(74) *Attorney, Agent, or Firm* — Paul S. Cha

(57) ABSTRACT

A solid oxide fuel cell (SOFC) for use in generating electricity while tolerating sulfur content in a fuel input stream. The solid oxide fuel cell includes an electrolyte, a cathode, and a sulfur tolerant anode. The cathode is disposed on a first side of the electrolyte. The sulfur tolerant anode is disposed on a second side of the electrolyte opposite the cathode. The sulfur tolerant anode includes a composition of nickel, copper, and ceria to exhibit a substantially stable operating voltage at a constant current density in the presence of the sulfur content within the fuel input stream. The solid oxide fuel cell is useful within a SOFC stack to generate electricity from reformate which includes synthesis gas (syngas) and sulfur content. The solid oxide fuel cell is also useful within a SOFC stack to generate electricity from unreformed hydrocarbon fuel.

26 Claims, 5 Drawing Sheets

(56) References Cited

OTHER PUBLICATIONS

Copenheaver, Blaine R., "International Search Report", (Mar. 9, 2009),1-3.
Copenheaver, Blaine R., "Written Opinion of the International Searching Authority", (Mar. 9, 2009),1-8.
Frost, Lyman et al., "Sulfur Tolerant Anode Development", (2007),1-21.

* cited by examiner

SULFUR TOLERANT ANODE FOR SOLID OXIDE FUEL CELL

CROSS-REFERENCE TO RELATED APPLICATIONS

This application claims the benefit of U.S. Provisional Application No. 60/975,761, filed on Sep. 27, 2007, which is incorporated by reference herein in its entirety.

FEDERALLY SPONSORED RESEARCH OR DEVELOPMENT

The U.S. Government has certain rights in this invention as provided for by the terms of Small Business Innovation Research (SBIR) Contract No. FA8650-07-M-2704 awarded by the U.S. Air Force.

BACKGROUND

Embodiments of this invention relate generally to the field of solid oxide fuel cells and, more specifically, to anode structures for solid oxide fuel cells.

A solid oxide fuel cell (SOFC) electrochemically converts fuel into electricity. The solid oxide fuel cell has a solid oxide, or ceramic, electrolyte between a cathode and an anode. A conventional solid oxide fuel cell utilizes an yttria-stabilized zirconia (YSZ) electrolyte between the cathode and the anode. In general, the cathode reduces oxygen from the air into oxygen ions and passes the oxygen ions through the electrolyte to the anode. A conventional cathode material is lanthanum strontium manganite (LSM), or a similar material. The anode uses the oxygen ions to oxidize the fuel, which results in free electrons at the anode. The anode is typically a ceramic/metallic (cermet) material that includes YSZ as the ceramic and nickel (Ni) as the metal. By connecting an electrical load between the anode and the cathode (outside of the fuel cell), the electrons can return to the cathode, and the electrical generation cycle can repeat.

FIG. 1 depicts a schematic block diagram of a conventional SOFC system 10. The conventional SOFC system 10 includes a reformer 12, a sulfur trap 14, and a conventional solid oxide fuel cell 16. Sulfur can rapidly poison and deactivate the Ni—YSZ cermet anode of the solid oxide fuel cell 16. Since many fuels contain total sulfur levels that far exceed the levels that can damage the typical anode of the solid oxide fuel cell 16, the reformer 12 and the sulfur trap 14 are used to remove sulfur content from the fuel. Typical fuels which may be reformed by the reformer 12 include military fuels such as JP-8, JP-5, and NATO F-76. While military fuel sources are energy dense, these fuels are extremely complex in composition and contain a number of impurities and additives that present challenges for compact electrochemical power generation. JP fuels can contain as much as 3,000-4,000 ppm by weight sulfur, while Navy fuels (NATO F-76, etc.) can include as much as 10,000 ppm by weight.

The reformer 12 implements a reformation process to break down hydrocarbons ($C_xH_y$) from the fuel into reformate which includes synthesis gas (syngas) and hydrogen sulfide ($H_2S$). The syngas includes hydrogen ($H_2$) and carbon monoxide (CO), and also may include other components such as carbon dioxide ($CO_2$) and steam ($H_2O$). Although reformation by the reformer 12 reduces the sulfur content, typical sulfur levels for reformate from JP fuels is about 500-600 ppmv from an endothermic steam reformer and 300-400 ppmv from a partial oxidation (POx) reformer.

Hydrogen sulfide ($H_2S$) content in the reformate of 2 ppmv (at 1000° C.) is known to poison the anode of a conventional solid oxide fuel cell 16. Additionally, sulfur poisoning increases the polarization resistance and overvoltage of the anode at as low as 0.5 ppmv (at 900° C.). This concentration of $H_2S$ is close to the equilibrium values measured at that temperature for the chemisorption of $H_2S$ to achieve full coverage on nickel steam-reforming catalysts. Because of this coverage, conventional Ni—YSZ cermet anodes are not sulfur tolerant.

Since the sulfur content of the reformate (i.e., syngas and sulfur) from the reformer 12 is significant enough to poison the anode, the reformate is directed through the sulfur trap 14 to remove the remaining sulfur content, leaving only the syngas. Many of the sulfur compounds present in these fuel streams are mildly reactive and, therefore, are relatively easy to remove. However, there are also considerable quantities of more complex sulfur compounds, including substituted thiophenes, which can be particularly difficult to remove via conventional liquid phase adsorption processes. In addition, even with the best possible liquid phase sulfur removal technology, the conventional solid oxide fuel cell is not capable of accommodating sulfur in the fuel stream due to intermittent malfunctions of the sulfur trap 14, or another sulfur removal system. In other words, occasional sulfur slip is anticipated. Additionally, the adsorption of liquid phase sulfur removal materials utilizes relatively large amounts of material, which increases the size and resources of the conventional SOFC system 10.

In contrast to the conventional Ni—YSZ cermet anodes, other conventional SOFC devices use a doped ceria (cerium oxide ($CeO_2$)) anode or a copper-ceria (Cu—$CeO_2$) anode. While ceria provides sulfur tolerance and some avoidance of coking if there is hydrocarbon slip, ceria is a mixed conductor in a fuel atmosphere and has low electronic conductivity. Thus, ceria alone does not provide a low polarization loss for a high performance anode. Infiltration of cerium nitrate ($Ce(NO_3)_3$) into a conventional Ni—YSZ cermet anode may show some level of tolerance to the presence of $H_2S$.

SUMMARY

Embodiments of an apparatus are described. In one embodiment, the apparatus is a solid oxide fuel cell (SOFC). The solid oxide fuel cell may be implemented to generate electricity while tolerating sulfur content in a fuel input stream. The solid oxide fuel cell includes an electrolyte, a cathode, and a sulfur tolerant anode. The cathode is disposed on a first side of the electrolyte. The sulfur tolerant anode is disposed on a second side of the electrolyte opposite the cathode. The sulfur tolerant anode includes a composition of nickel, copper, and ceria to exhibit a substantially stable operating voltage at a constant current density in the presence of the sulfur content within the fuel input stream. Other embodiments of the solid oxide fuel cell are also described.

The solid oxide fuel cell is useful within a SOFC stack, which includes a plurality of solid oxide fuel cells coupled together, for example, in a serial configuration. Embodiments of the SOFC stack are useful to generate electricity from reformate which includes synthesis gas (syngas) and sulfur content. Embodiments of the SOFC stack are also useful to generate electricity from unreformed hydrocarbon fuel. Other embodiments of a SOFC system which uses a SOFC stack with sulfur tolerant anodes are also described.

Embodiments of a method are also described. In one embodiment, the method is a method of making a solid oxide fuel cell. The method includes disposing a cathode on a first side of an electrolyte. The method also includes disposing a sulfur tolerant anode on a second side of the electrolyte. The sulfur tolerant anode operates at a substantially stable operating voltage at a constant current density in the presence of a fuel with a measurable sulfur content. In some embodiments, nitrates or oxides may be mixed and disposed on the electrolyte using a Pechini or glycine nitrate process. In some embodiments, a mixture of components may be disposed on the electrolyte using a solid state process. In some embodiments, the mixture of components may be a mixture or nitrates or fine particles (e.g., nanoparticles) which are infiltrated into a porous material, such as the electrolyte or an inert material disposed on the electrolyte.

Some embodiments may combine two or more of the various structures and/or functions described herein. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
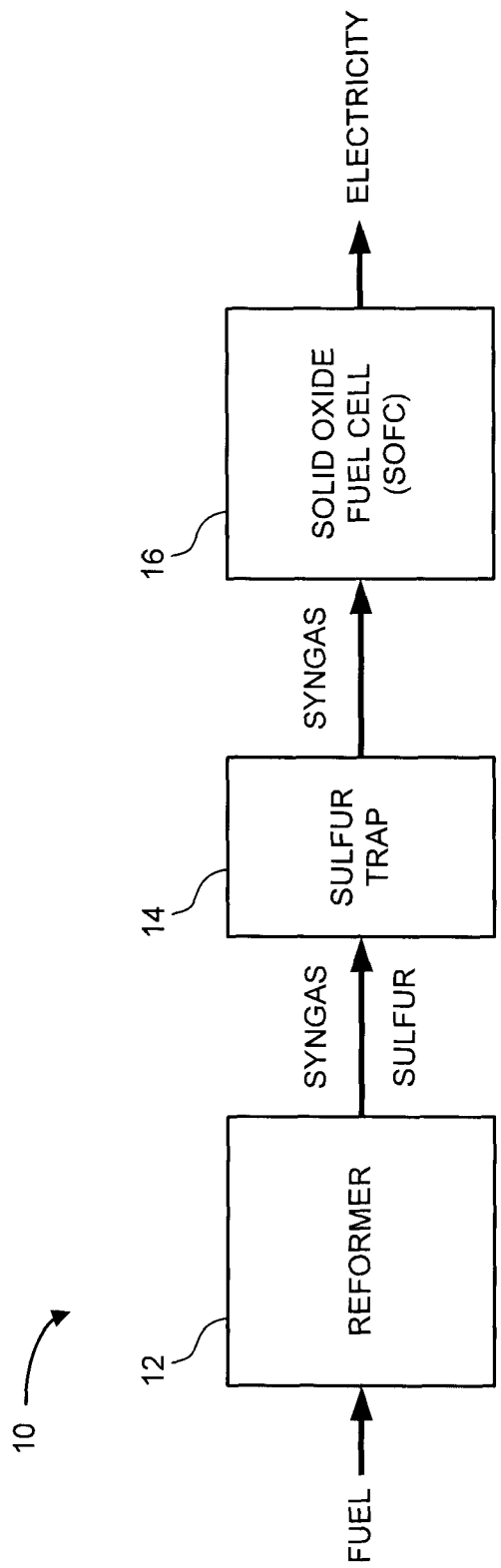
FIG. 1 depicts a schematic block diagram of a conventional solid oxide fuel cell (SOFC) system.

It will be readily understood that the components of the embodiments as generally described herein and illustrated in the appended Figures could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

In the following description, specific details of various embodiments are provided. However, some embodiments may be practiced without at least some of these specific details. In other instances, certain methods, procedures, components, and circuits are not described in detail for the sake of brevity and clarity, but are nevertheless understood from the context of the description herein.

In general, the described embodiments are directed to a sulfur tolerant anode for a solid oxide fuel cell (SOFC). Since typical hydrocarbon fuels have sulfur content, and sulfur can irreparably damage the anode of a conventional solid oxide fuel cell, embodiments described herein relate to a solid oxide fuel cell with an anode that is tolerant of sulfur. The sulfur tolerance of the anode may be manifested by the ability of the solid oxide fuel cell to generate electricity at a substantially stable operating voltage at a constant current density, even though the operating voltage may be relatively lower when sulfur is present in the input field stream.

Various improvements can be made over an anode of a conventional solid oxide fuel cell in order to improve the sulfur tolerance of the solid oxide fuel cell. In one embodiment, some or all of the YSZ in a conventional Ni—YSZ cermet anode can be replaced with doped ceria. The doped ceria contributes to sulfur tolerance of the anode. The doped ceria also contributes to coke suppression at the anode.

In another embodiment, some of the nickel in a conventional Ni—YSZ cermet anode can be replaced with an electrochemically inert oxide material. Some examples of electrochemically inert oxide materials include thorium oxide ($ThO_2$), zirconium oxide ($ZrO_2$), magnesium oxide (MgO), a titanium oxide ($TiO_2$), potassium oxide ($K_2O$), and a tungsten oxide ($WO_2$), although other embodiments may use other electrochemically inert oxide materials. The addition of the electrochemically inert oxide material contributes to sulfur tolerance and coke suppression of the anode.

In another embodiment, copper is added to the anode structure. The copper contributes to oxidation of some hydrocarbons. Thus, the copper within the anode facilitates direct oxidation of certain hydrocarbon fuels. When combined with the sulfur tolerance properties achieved by the addition of ceria and the electrochemically inert oxide material (e.g., MgO), the direct oxidation by the copper allows a hydrocarbon fuel source with sulfur content to be processed by the solid oxide fuel cell without significant degradation of the performance of the solid oxide fuel cell.

By implementing a sulfur tolerant anode in a solid oxide fuel cell, the solid oxide fuel cell may be used in a system with a reformer and a sulfur trap, even if the sulfur trap malfunctions and allows sulfur to reach the solid oxide fuel cell. Also, the solid oxide fuel cell with a sulfur tolerant anode may be used in a system which omits the sulfur trap, so that the solid oxide fuel cell processes reformate which includes syngas and sulfur content. Additionally, the solid oxide fuel cell with the sulfur tolerant anode may be used in a system which omits both the reformer and the sulfur trap, so that the solid oxide fuel cell with the sulfur tolerant anode processes hydrocarbon fuel using direct oxidation. The omission of the sulfur trap and/or the reformer from a SOFC power generation system allows embodiments of the SOFC power generation system to be made lighter, simpler, and more reliable.

Figure 2:
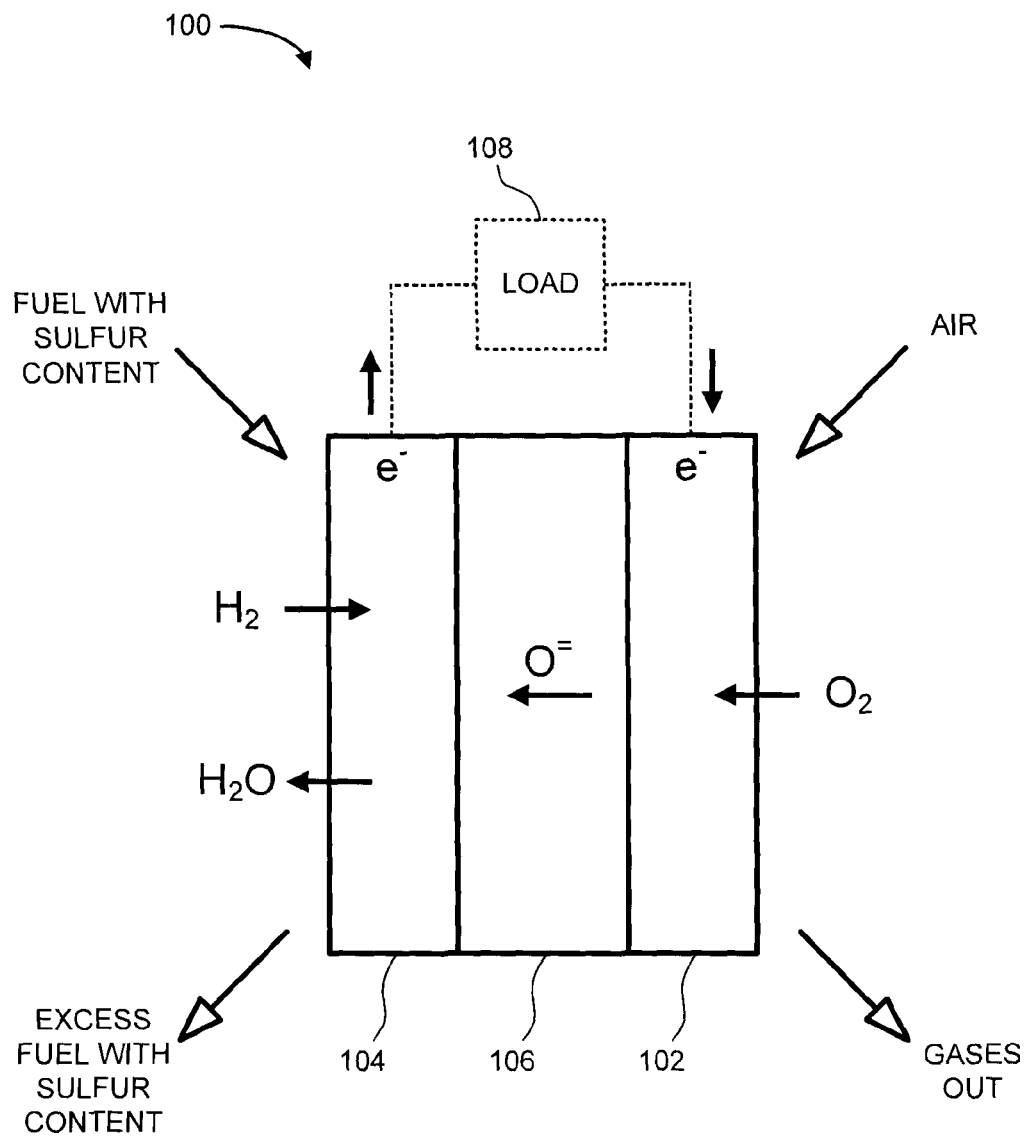
FIG. 2 depicts a schematic block diagram of one embodiment of a sulfur tolerant solid oxide fuel cell.

FIG. 2 depicts a schematic block diagram of one embodiment of a sulfur tolerant solid oxide fuel cell 100. The illustrated sulfur tolerant solid oxide fuel cell 100 includes a cathode 102, a sulfur tolerant anode 104, and an electrolyte 106. In general, the cathode 102 extracts oxygen ($O_2$) from an input oxidant (e.g., ambient air) and reduces the oxygen into oxygen ions. The remaining gases are exhausted from the solid oxide fuel cell 100. The electrolyte 106 diffuses the oxygen ions from the cathode 102 to the anode 104. The anode 104 uses the oxygen ions to oxidize hydrogen ($H_2$) from the input fuel (i.e., combine the hydrogen and the oxygen ions). The oxidation of the hydrogen forms water ($H_2O$) and free electrons ($e^-$). The water exits the anode 104 with any excess fuel and sulfur. The free electrons can travel through a circuit (shown dashed with a load 108) between the anode 104 and the cathode 102. When combined with other solid oxide fuel cells 100 within a SOFC stack, the power generation capabilities of all of the solid oxide fuel cells 100 can be combined to output more power.

The anode 104 is sulfur tolerant and, in some embodiments, receives fuel with sulfur content. The fuel may be reformate which includes syngas and sulfur. Alternatively the fuel may be a hydrocarbon fuel which includes sulfur containing compounds. Although embodiments of the solid oxide fuel cell are described herein as being sulfur tolerant and capable of processing fuel in the presence of sulfur, without significant degradation, embodiments of the solid oxide fuel cell are also capable of processing fuel in the absence of sulfur.

One example of a sulfur tolerant anode 104 is an anode formed with nickel, copper, magnesium oxide, and ceria (e.g., Ni—Cu—MgO-ceria). The nickel in the anode 104 contributes to oxidation of hydrogen. The magnesium oxide decreases the amount of nickel and increases the sulfur tolerance of the anode 104. The magnesium oxide also suppresses coke formation at the anode 104. Although magnesium oxide is specifically referenced in this example, other embodiments may use other types of electrochemically inert oxide materials. The ceria in the anode 104 also increases sulfur tolerance of the anode 104 and suppresses coke formation at the anode 104. The copper allows direct oxidation of certain hydrocarbons. The copper also maintains a relatively high conductivity of the anode 104. Thus, the combination of nickel, copper, magnesium oxide, and ceria results in an anode structure 104 which is substantially sulfur tolerant and coke resistant, while maintaining a relatively high conductivity. The sulfur tolerance and direct oxidation capabilities of the anode 104 allow embodiments of the solid oxide fuel cell 100 to directly process hydrocarbon fuels which might have sulfur content associated with the fuel.

Figure 4:
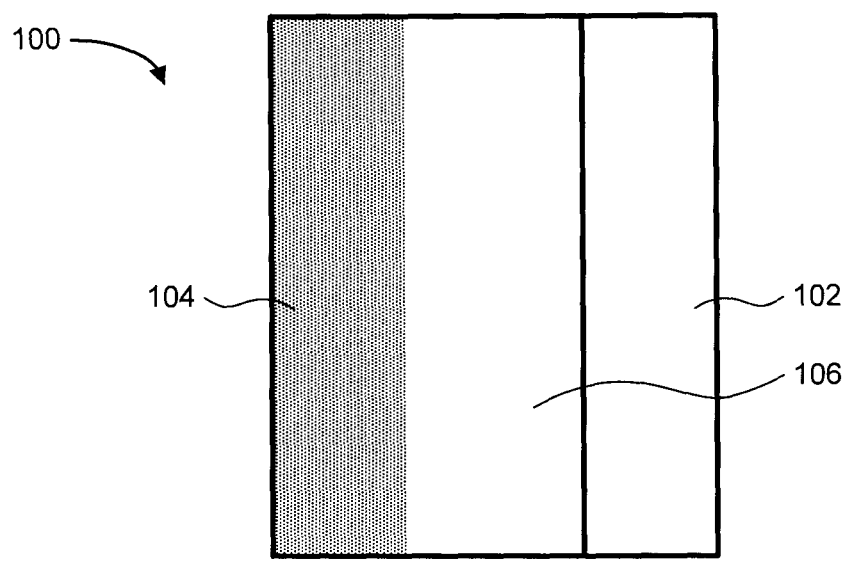
FIG. 4 depicts a schematic block diagram of another embodiment of the sulfur tolerant solid oxide fuel cell of FIG. 2 with the anode infiltrated into a portion of the electrolyte.

The sulfur tolerant anode 104 may be made and disposed on the electrolyte 106 using any suitable technique. In one embodiment, the anode materials are applied to a porous surface of the electrolyte 106 so that the anode materials at least partially infiltrate the electrolyte 106. An example of infiltrating the electrolyte 106 with anode materials is shown in FIG. 4 and described in more detail below. In contrast to infiltration techniques, some embodiments of the solid oxide fuel cell 100 implement the anode materials disposed substantially on a surface of the electrolyte 106, rather than infiltrating the structure of the electrolyte 106.

In one embodiment, the anode materials are synthesized using a Pechini, or glycine nitrate, process. In general, the Pechini process involves mixing nitrates of the anode materials (e.g., Ni, Cu, Co, Mg, ceria, and a dopant for the ceria) with ethylene glycol and citric acid, charring the mixture at about 150° C., calcining the char at about 1000° C., and milling the resulting material. The resulting anode is made into a paste using a binder and solvent system, and the paste is screen printed onto the electrolyte 106 and fired. The Pechini process is described in greater detail in U.S. Pat. No. 3,330,697, entitled "Method of preparing lead and alkaline earth titanates and niobates and coating method using the same to form a capacitor."

In another embodiment, the anode materials are synthesized using a solid state process. In one embodiment, oxides and carbonates of the anode components are admixed and calcined to obtain a two phase mixture. A resulting anode powder is made into a paste using a binder, and the paste is screen printed onto the electrolyte 106, which is then fired.

Thus, in various embodiments, raw materials in the form of nitrates, oxides, and carbonates of copper, nickel, and one or more inert oxides, as appropriate for Pechini, glycine nitrate, solid state or any known process for ceramic and cermet powder manufacture, are used as the starting materials. When the anode material is prepared, the anode material contains a mixture (i.e., a solid solution) of the oxides of nickel, copper, and the inert oxide. When exposed to the fuel gas such as hydrogen or syngas, only the NiO and CuO in the solid solution is reduced to a metallic phase as distinct nickel and copper, or more commonly as an alloy of Ni and Cu, leaving an extremely fine dispersion of the inert oxide. One example of the inert oxide is MgO, although other inert oxides are described herein. In particular, other inert oxides that have at least 1 to 20 mole percent solubility in the (NiCu)O solid solution can also be employed. With a solid solution of NiO, CuO, and MgO, there is a substantial region of the phase diagram (not shown) where the solid solution of the three oxides is present as (Mg, Ni, Cu)O. In all cases, only the oxides of Ni and Cu reduce to the metallic phase, leaving a fine dispersion of inert oxide in the metal grains.

Figure 3:
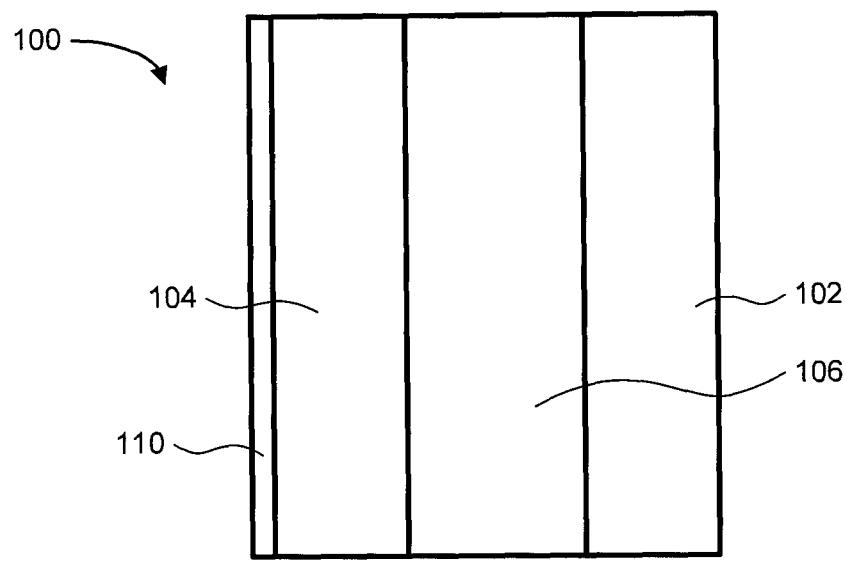
FIG. 3 depicts a schematic block diagram of another embodiment of the sulfur tolerant solid oxide fuel cell of FIG. 2, including a catalyst disposed on the anode.

FIG. 3 depicts a schematic block diagram of another embodiment of the sulfur tolerant solid oxide fuel cell 100 of FIG. 2, including a catalyst 110 disposed on the anode 104. The catalyst 110 also contributes to the sulfur tolerance of the anode 104. Additionally, the catalyst 110 may improve other aspects of the electrochemical performance of the anode 104 and the solid oxide fuel cell 100. The catalyst material being present as very fine, high surface area particles on the interior porous surface of the anode structure enhances the adsorption and dissociation of the fuel molecules and enables diffusion of the adsorbed and dissociated species to the electrochemical reaction sites. This improves the reaction kinetics and results in improved performance. Some examples of catalyst materials include praseodymium (Pr) and cobalt (Co), although other types of rare earth metals may be used. In an embodiment which uses cobalt as the catalyst 110, the anode structure can be described, generally, by the chemical formula Ni—Co—Cu—MgO-ceria. In some embodiments, ceria may be used as the catalyst 110.

The catalyst 110 is shown as a separate layer from the anode 104, but in some embodiments the catalyst 110 may be disposed within a surface portion of the anode 104. For example, the catalyst 110 may be infiltrated into a portion of the anode 104. More specifically, infiltrant cations of the catalyst 110 may be introduced during anode synthesis. In one embodiment, a liquid form of nitrates of cobalt and/or praseodymium is impregnated into a porous anode material so that porous spaces within the anode material receive a coating of the liquid catalyst material. Upon heating, the cobalt and praseodymium salts are converted to cobalt and praseodymium metals which coat the anode 104. In some embodiments, the resulting content of the catalyst 110 disposed on the anode 104 is generally less than about 1% by weight, although other embodiments may result in more than 1% by weight.

FIG. 4 depicts a schematic block diagram of another embodiment of the sulfur tolerant solid oxide fuel cell 100 of FIG. 2 with the anode 104 infiltrated into a portion of the electrolyte 106. In the depicted solid oxide fuel cell 100, the anode 104 is not formed as a separate material which is applied to a surface of the electrolyte 106. Rather, the anode 104 is formed by infiltration of materials which are applied to a porous surface and allowed to fill in porous spaces of the electrolyte 106.

In one embodiment, the materials are combined within a liquid mixture (e.g., a nitrate mixture) which is infiltrated into a porous portion of the electrolyte 106. In some embodiments, the materials are combined as fine particles (e.g., nanoparticles) which are then infiltrated into a porous portion of the electrolyte 106. The porous portion of the electrolyte 106 may be formed of an electrolyte material such as zirconia (e.g., YSZ) or ceria. Alternatively, the mixture of anode materials may be infiltrated into a porous inert material such as alumina ($Al_2O_3$) disposed on the electrolyte 106. In this embodiment, the anode materials are not infiltrated directly into the electrolyte 106, but are infiltrated into the inert material disposed on a surface of the electrolyte 106.

Figure 5:
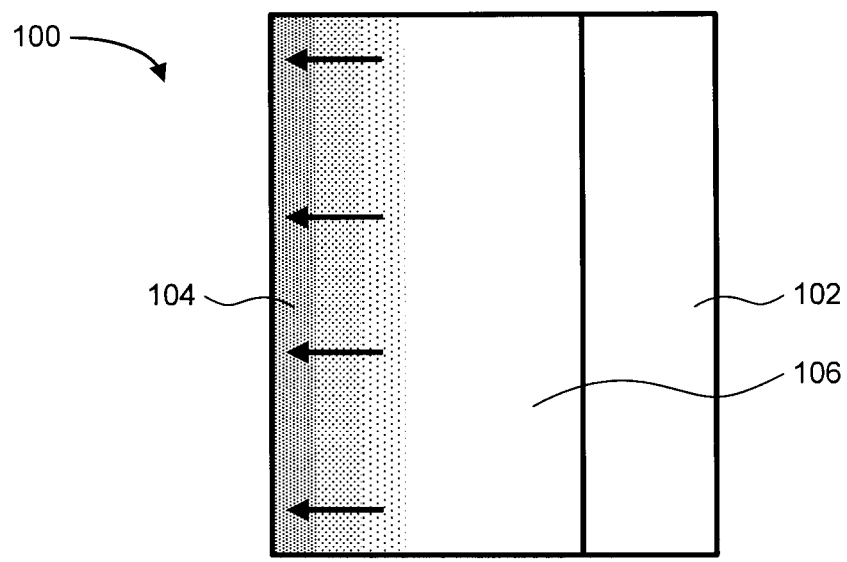
FIG. 5 depicts a schematic block diagram of another embodiment of the sulfur tolerant solid oxide fuel cell of FIG. 4 with a graded ceria anode.

FIG. 5 depicts a schematic block diagram of another embodiment of the sulfur tolerant solid oxide fuel cell 100 of FIG. 4 with a graded ceria anode 104. In general, the arrows within the anode 104 portion of the solid oxide fuel cell 100 indicate an increasing concentration of ceria in the direction of the arrows and, correspondingly, a decreasing concentration of electrolyte material in the opposite direction. As mentioned above, the addition of ceria in the anode 104 can enhance the sulfur tolerance of the anode 104. The ceria also suppresses coke formation at the anode 104 so that carbon particles (e.g., from cracked hydrocarbons) do not form a film on the anode 104 and prevent the anode 104 from facilitating the oxidation of water and generation of free electrons. However, it may be difficult to dispose a ceria-based anode on the electrolyte 106.

In order to dispose a ceria-based anode on the electrolyte 106, it may be useful to mix the ceria with at least some of the electrolyte material. For example, the anode 104 may include a mixture of ceria and YSZ. Additionally, the mixture of ceria and YSZ may be graded within the anode 104 so that there is more electrolyte material near the electrolyte 106 and more ceria near the exposed surface of the anode 104. In other words, the graded ceria anode 104 has a proportional concentration of the ceria and the YSZ which varies approximately relative to a distance from the electrolyte 106. In this way, the higher concentration of electrolyte material near the electrolyte 106 helps the anode 104 to be disposed on the electrolyte 106, while the higher concentration of ceria near the exposed surface of the anode 104 facilitates sulfur tolerance and coke suppression.

Figure 6:
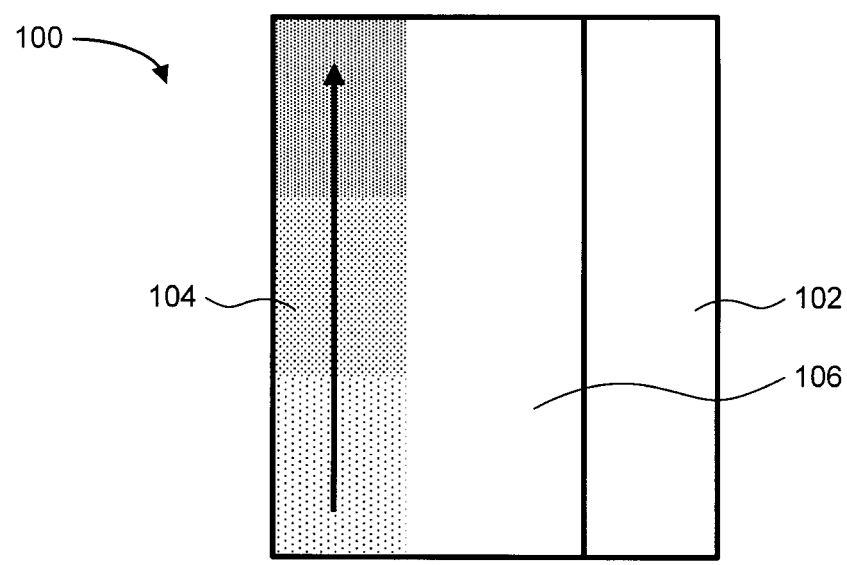
FIG. 6 depicts a schematic block diagram of another embodiment of the sulfur tolerant solid oxide fuel cell of FIG. 4 with a graded copper anode.

FIG. 6 depicts a schematic block diagram of another embodiment of the sulfur tolerant solid oxide fuel cell 100 of FIG. 4 with a graded copper anode 104. Like the graded ceria anode 104 shown in FIG. 5 and described above, the graded copper anode 104 of FIG. 6 has a varying concentration of copper within the anode 104 of the solid electrolyte fuel cell 100. In the depicted embodiment, the concentration of copper within the anode 104 is relatively higher at a fuel input end of the anode 104, as indicated by the arrow, and lower at a fuel output end of the anode 104. Thus, the copper concentration within the sulfur tolerant anode 104 varies along a distance between a fuel input end of the sulfur tolerant anode 104 and a fuel output end of the sulfur tolerant anode 104.

While copper within the anode 104 provides direct oxidation of certain hydrocarbons, as well as suppression of coke formation, copper does not oxidize some lower hydrocarbons such as methane. Therefore, fully distributed copper within the anode 104 (along the length of the fuel path) may limit the type of fuel that may be processed and utilized in the solid oxide fuel cell 100. Hence, the graded copper anode 104 includes decreasing concentrations of copper along the fuel flow direction of the anode 104. In this way, higher hydrocarbons are oxidized near the fuel entrance, or intake, and lower hydrocarbons are oxidized closer to the fuel output, or outlet. Additionally, some embodiments of the graded copper anode 104 facilitate internal reformation, in addition to direct oxidation. Thus, for these reasons, the graded copper anode 104 can facilitate higher fuel utilization compared with an anode that does not include copper or an anode that only includes evenly distributed copper.

Figure 7:
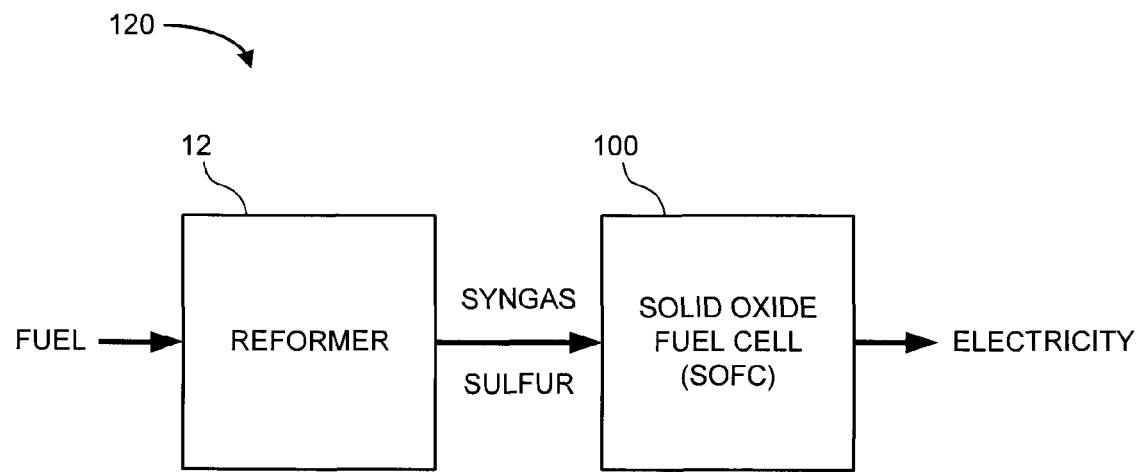
FIG. 7 depicts a schematic block diagram of one embodiment of a SOFC system which includes the sulfur tolerant solid oxide fuel cell of FIG. 2.

FIG. 7 depicts a schematic block diagram of one embodiment of a SOFC system 120 which includes the sulfur tolerant solid oxide fuel cell 100 of FIG. 2. The illustrated SOFC system 120 includes the reformer 12 operably connected to the solid oxide fuel cell 100. The reformer 12 at least partially oxidizes the fuel to produce reformate. The reformate includes syngas and sulfur, although the sulfur concentration of the reformate may be significantly lower than the sulfur concentration of the unreformed fuel.

The reformate, including the syngas and sulfur, is directed from the reformer 12 to the solid oxide fuel cell 100. In contrast to the conventional SOFC system 10 illustrated in FIG. 1, the SOFC system 10 of FIG. 7 omits the sulfur trap 14. However, the illustrated SOFC system of FIG. 7 is also representative of a SOFC system which includes a malfunctioning, or otherwise inoperable, sulfur trap 14. In the absence of the sulfur trap 14, or in the conditions of an inoperable sulfur trap 14, the solid oxide fuel cell 100 with the sulfur tolerant anode 104 is nevertheless capable of operating to generate electricity even though the reformate includes sulfur. Moreover, embodiments of the solid oxide fuel cell 100 may exhibit a substantially stable operating voltage, despite the presence of sulfur in the reformate which is used by the solid oxide fuel cell 100.

Figure 8:
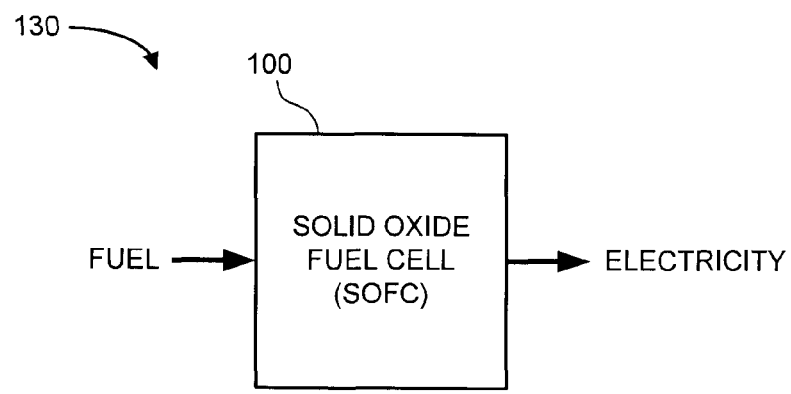
FIG. 8 depicts a schematic block diagram of another embodiment of a SOFC system which includes the sulfur tolerant solid oxide fuel cell of FIG. 2.

FIG. 8 depicts a schematic block diagram of another embodiment of a SOFC system 120 which includes the sulfur tolerant solid oxide fuel cell 100 of FIG. 2. In the illustrated SOFC system 130, both the reformer 12 and the sulfur trap 14 are omitted. Thus, the fuel is fed directly into the solid oxide fuel cell 100 to generate electricity. Depending on the sulfur content of the fuel, and the composition of the solid oxide fuel cell 100, the solid oxide fuel cell 100 may be capable of directly oxidizing the fuel despite relatively high sulfur content.

It should be noted that references herein to the solid oxide fuel cell 100 may also be used to refer to a stack of solid oxide fuel cells 100. The stack of solid oxide fuel cells 100 may be referred to as a SOFC stack. Thus, depictions and descriptions of an individual solid oxide fuel cell 100 are also representative of a SOFC stack. In particular, the SOFC systems 120 and 130 of FIGS. 7 and 8 may include SOFC stacks instead of individual solid oxide fuel cells 100.

With various sulfur concentrations of different fuels, for the direct oxidation the sulfur concentration can be up to 15 ppm by weight and for the syngas case the sulfur concentration could be as high as 1,000 ppm by volume. The effect of sulfur on the anode performance is strongly temperature dependent. While sulfur concentrations as high as 200 ppmv, typical of most reformed fuel, is tolerated with only a minor loss in operating voltage at a constant current density at 700 to 800° C. operating temperature, a much higher sulfur concentration as much as 1,000 ppm can be tolerated when the cell is operated at temperatures of 900 to 1000° C. Some embodiments may operate at different operating voltages, current densities, and/or temperatures.

At a typical constant current density operation, the anode performance will drop only about 20 to 100 mV when sulfur containing fuel is introduced, relative to the operating voltage of the anode when operated with sulfur free fuel. The exact magnitude of change is dependent on the sulfur concentration, operating current density, and temperature. Higher sulfur concentration and higher current density will cause higher voltage drop. In contrast a higher operating temperature will cause lower voltage drop.

More generally, the relationships among sulfur concentration, current density, operating temperature, and operating voltage allows one or more of the operating characteristics to be adjusted or optimized based on one or more of the remaining operating characteristics. Additionally, the relationship among voltage, current, and resistance can also affect the operation of the sulfur tolerant anode. For example, the load 108 could be a constant resistance load, in which case the voltage and current of the solid oxide fuel cell 100 effectively go down in response to degradation of the sulfur tolerant anode 104. Alternatively, the load 108 could be a constant current load, in which case only the voltage goes down in response to degradation of the sulfur tolerant anode 104. In another embodiment, the load 108 could be a constant voltage load, in which case only the current goes down in response to degradation of the sulfur tolerant anode 104. Thus, embodiments of the solid oxide fuel cell 100 can achieve a stable output power, in which the voltage and current are tied to the internal cell resistance.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A solid oxide fuel cell (SOFC) comprising:
an electrolyte;
a cathode disposed on a first side of the electrolyte; and
a sulfur tolerant anode disposed on a second side of the electrolyte opposite the cathode, wherein the sulfur tolerant anode comprises a composition of nickel (Ni), copper (Cu), and ceria ($CeO_2$) to exhibit a substantially stable operating voltage at a constant current density in the presence of a fuel with a measurable sulfur content, wherein there is no YSZ in the sulfur tolerant anode.

2. The solid oxide fuel cell of claim 1, wherein the sulfur tolerant anode is configured to exhibit the substantially stable operating voltage in the presence of the fuel with the measurable sulfur content greater than about 2.0 ppmv.

3. The solid oxide fuel cell of claim 1, wherein the sulfur tolerant anode is configured to exhibit the substantially stable operating voltage in the presence of the fuel with the measurable sulfur content greater than about 5 ppmv.

4. The solid oxide fuel cell of claim 1, wherein the sulfur tolerant anode is configured to exhibit the substantially stable operating voltage in the presence of the fuel with the measurable sulfur content greater than about 50 ppmv.

5. The solid oxide fuel cell of claim 1, wherein the substantially stable operating voltage is within approximately 100 mV of a sulfur-free operating voltage of the solid oxide fuel cell.

6. The solid oxide fuel cell of claim 1, wherein the substantially stable operating voltage is within approximately 50 mV of a sulfur-free operating voltage of the solid oxide fuel cell.

7. The solid oxide fuel cell of claim 1, wherein the substantially stable operating voltage is within approximately 20 mV of a sulfur-free operating voltage of the solid oxide fuel cell.

8. The solid oxide fuel cell of claim 1, wherein the sulfur tolerant anode is configured to facilitate direct oxidation of a hydrocarbon fuel in the absence of a reformation process to reform the hydrocarbon fuel to a synthesis gas (syngas).

9. The solid oxide fuel cell of claim 1, wherein the sulfur tolerant anode is configured to electrochemically oxidize a synthesis gas (syngas) in the presence of sulfur content.

10. The solid oxide fuel cell of claim 1, wherein the composition of the sulfur tolerant anode further comprises an electrochemically inert ceramic oxide finely dispersed within a metallic phase of the sulfur tolerant anode, wherein the metallic phase of the sulfur tolerant anode comprises the nickel and the copper, wherein the nickel contributes to oxidation of hydrogen ($H_2$) and carbon monoxide (CO), the copper contributes to oxidation of a hydrocarbon, and the electrochemically inert ceramic oxide and the ceria contribute to sulfur tolerance and coke resistance of the sulfur tolerant anode.

11. The solid oxide fuel cell of claim 10, further comprising a catalyst disposed with the sulfur tolerant anode, wherein the catalyst is configured to contribute to the sulfur tolerance of the sulfur tolerant anode.

12. The solid oxide fuel cell of claim 11, wherein the catalyst comprises praseodymium (Pr).

13. The solid oxide fuel cell of claim 11, wherein the catalyst comprises cobalt (Co).

14. The solid oxide fuel cell of claim 11, wherein the catalyst is infiltrated into a surface of the sulfur tolerant anode.

15. The solid oxide fuel cell of claim 10, wherein the sulfur tolerant anode comprises a graded copper anode in which a copper concentration within the sulfur tolerant anode varies along a distance between a fuel input end of the sulfur tolerant anode and a fuel output end of the sulfur tolerant anode.

16. The solid oxide fuel cell of claim 10, wherein the electrochemically inert ceramic oxide comprises one oxide of a thorium oxide ($ThO_2$), a zirconium oxide ($ZrO_2$), a magnesium oxide (MgO), a titanium oxide ($TiO_2$), a potassium oxide ($K_2O$), and a tungsten oxide ($WO_2$).

17. A solid oxide fuel cell (SOFC) system comprising:
a SOFC stack with a plurality of solid oxide fuel cells connected together at a single electrical output, wherein each solid oxide fuel cell comprises:
an electrolyte;
a cathode disposed on a first side of the electrolyte; and
a sulfur tolerant anode disposed on a second side of the electrolyte opposite the cathode, wherein each sulfur tolerant anode comprises a composition of nickel (Ni), copper (Cu), and ceria ($CeO_2$) to exhibit a substantially stable operating voltage at a constant current density during direct oxidation of a hydrocarbon fuel, wherein there is no YSZ in the sulfur tolerant anode.

18. The SOFC system of claim 17, wherein the composition of the sulfur tolerant anode further comprises an electrochemically inert ceramic oxide to enhance sulfur tolerance of the sulfur tolerant anode and to prevent coke formation at the sulfur tolerant anode.

19. The SOFC system of claim 18, wherein the electrochemically inert ceramic oxide is finely dispersed within a metallic phase of the nickel and the copper.

20. The SOFC system of claim 18, wherein the electrochemically inert ceramic oxide comprises one oxide of a thorium oxide ($ThO_2$), a zirconium oxide ($ZrO_2$), a magnesium oxide (MgO), a titanium oxide ($TiO_2$), a potassium oxide ($K_2O$), and a tungsten oxide ($WO_2$).

21. The SOFC system of claim 18, wherein the composition of the sulfur tolerant anode further comprises a catalyst to enhance the sulfur tolerance of the sulfur tolerant anode.

22. The SOFC system of claim 21, wherein the catalyst comprises a rare earth metal.

23. The SOFC system of claim 22, wherein the catalyst comprises praseodymium (Pr) or cobalt (Co).

24. The SOFC system of claim 17, wherein the sulfur tolerant anode comprises a graded copper anode in which a copper concentration within the sulfur tolerant anode varies from a relatively high copper concentration at a fuel input end of the sulfur tolerant anode and a relatively low copper concentration at a fuel output end of the sulfur tolerant anode.

25. The SOFC system of claim 17, further comprising a reformer coupled to the SOFC stack, wherein the reformer is configured to reform a hydrocarbon fuel to generate a reformate comprising synthesis gas (syngas) and sulfur content, and the SOFC stack is configured to receive the reformate and generate electricity from the syngas while operating at a substantially stable operating voltage in the presence of the sulfur content.

26. The SOFC system of claim 17, wherein the SOFC stack further comprises a direct fuel input to directly receive unreformed hydrocarbon fuel and to generate electricity from the hydrocarbon fuel while operating at a substantially stable operating voltage in the presence of sulfur content of the hydrocarbon fuel.

* * * * *